Nov. 26, 1968  B. B. EVANS  3,412,692

CARGO TIE-DOWN APPARATUS

Filed Dec. 1, 1966  2 Sheets-Sheet 1

INVENTOR
BRYCE B. EVANS

BY
*his* ATTORNEY

Nov. 26, 1968          B. B. EVANS          3,412,692
CARGO TIE-DOWN APPARATUS
Filed Dec. 1, 1966          2 Sheets-Sheet 2

INVENTOR
BRYCE B. EVANS

BY
his ATTORNEY

United States Patent Office 3,412,692
Patented Nov. 26, 1968

3,412,692
CARGO TIE-DOWN APPARATUS
Bryce B. Evans, Jackson, Mich., assignor to
Aeroquip Corporation, Jackson, Mich.
Filed Dec. 1, 1966, Ser. No. 598,474
8 Claims. (Cl. 105—369)

ABSTRACT OF THE DISCLOSURE

The present invention relates to a cargo control tie-down system especially usable with cargo of uniform size. Angle brackets are applied to the corners of the cargo and include adjustable and slideable take-up devices for tensioning the tie-down webbing.

---

The invention pertains to cargo hold-down apparatus, and is particularly adapted for use with cargo having angularly related intersecting surfaces.

Cargo shipped on railway cars, aircraft, and trucks is often tied down to prevent shifting of the cargo within vehicle. Cargo hold-down devices usually simply consist of a chain or strap which is passed over the cargo and anchored to the cargo-supporting surface. Tensioning of the chain or strap produces a force on the cargo tending to hold the cargo on the supporting surface and prevent shifting of the cargo with respect to the supporting surface. The use of such chains or straps is often objectionable, in that as the tension members pass over corners or edges of the cargo, damage can be inflicted thereto. Cargo damage particularly occurs where the cargo is of a relatively soft material, such as gypsum board, lumber, plywood sheets, plasterboard, and the like. With such "soft" sheet cargo, it is a common practice to discard several of the upper layers of sheets due to damage incurred during shipment by the hold-down means.

It is an object of the invention to provide a cargo hold-down which is capable of producing an effective holding force without damaging the cargo. The invention is particularly advantageous when used with "soft" cargo of the aforedescribed type.

Another object of the invention is to provide a cargo hold-down apparatus which is of an economical construction whereby a uniform hold-down pressure may be produced thereby and wherein the cargo is protected from forces exerted thereon by the hold-down apparatus.

A further object of the invention is to provide a cargo hold-down which utilizes a stretchable webbing capable of withstanding extensive tension forces, and wherein the tensioning apparatus is self-adjusting to equally distribute the forces produced in the webbing upon the cargo.

Yet another object of the invention is to provide an arrangement and system of hold-down devices particularly suitable for use with cargo comprising a plurality of stacked sheets.

An additional object of the invention is to provide a cargo hold-down which is of a lightweight, easily handled and stored, and versatile in operation.

Figure 1:
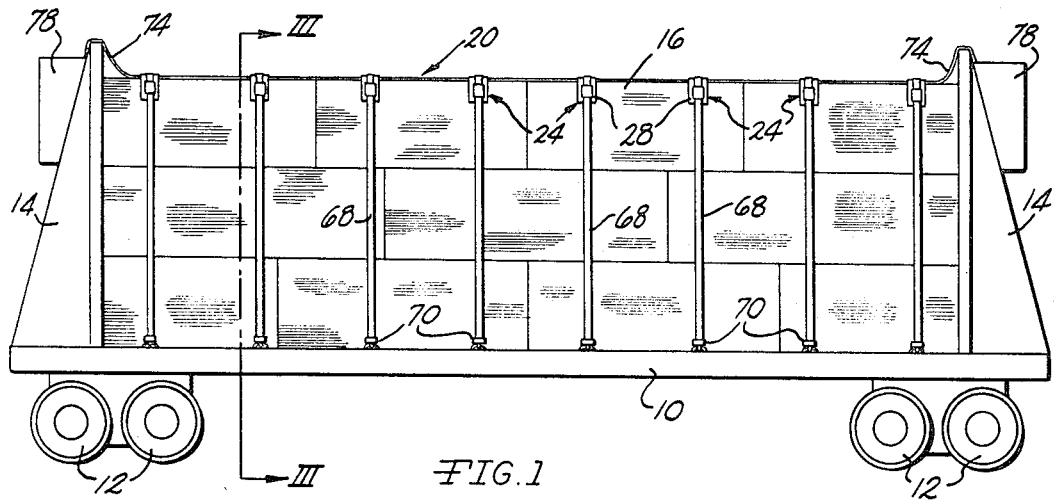
Figure 2:
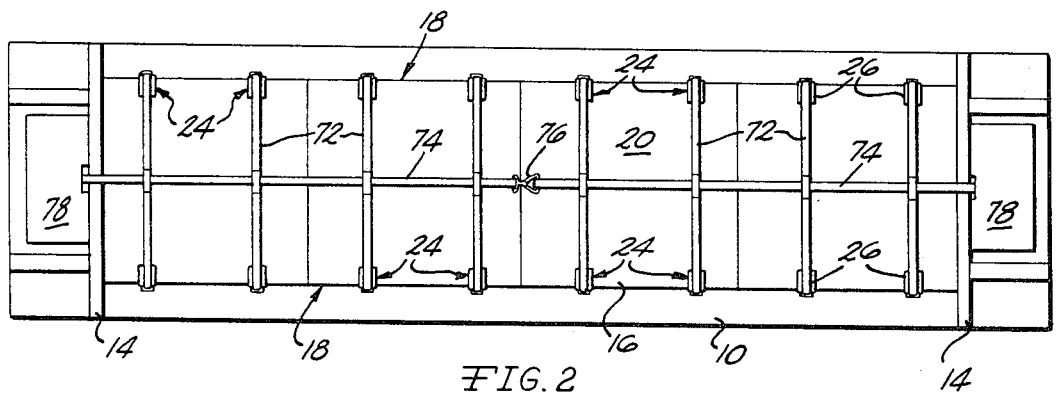
Figure 3:
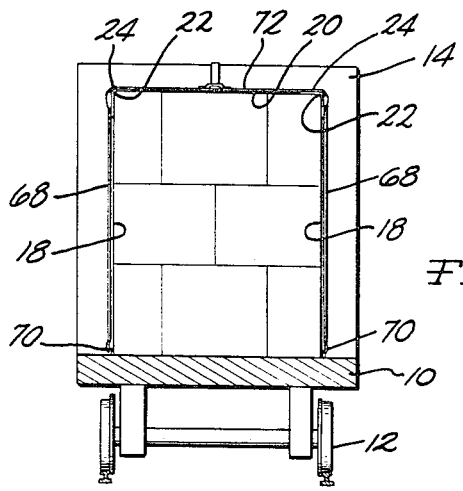
Figure 4:
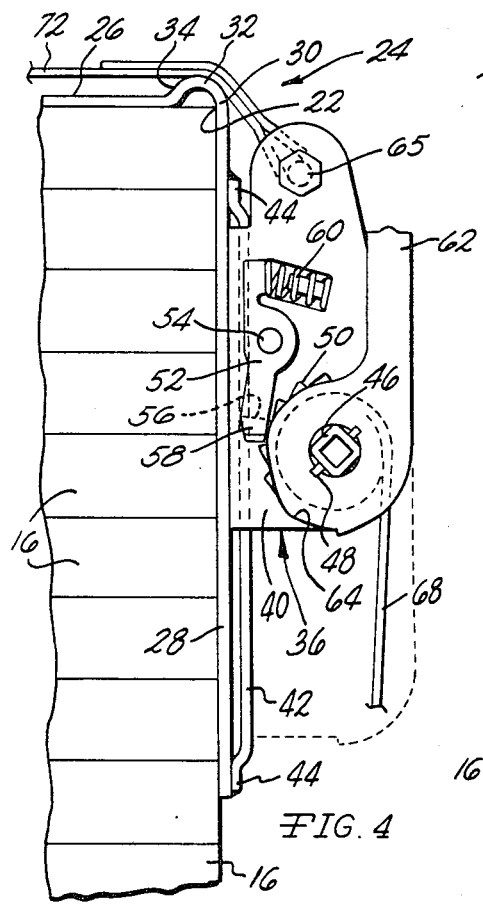
Figure 5:
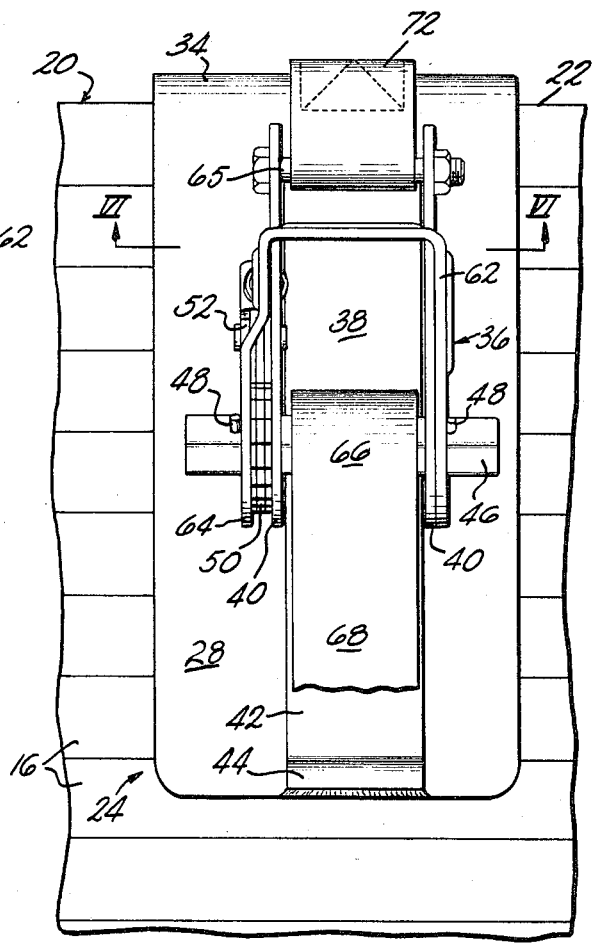
Figure 7:
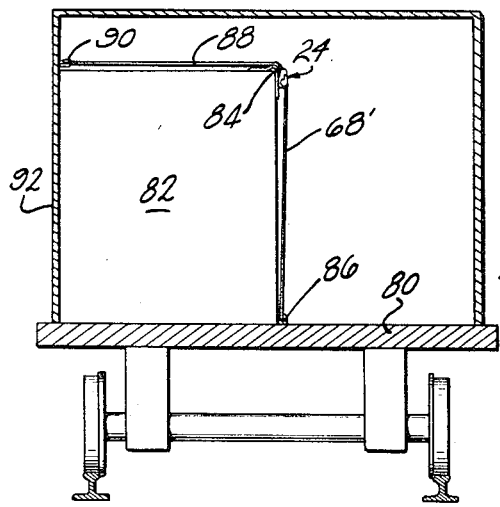
Figure 6:
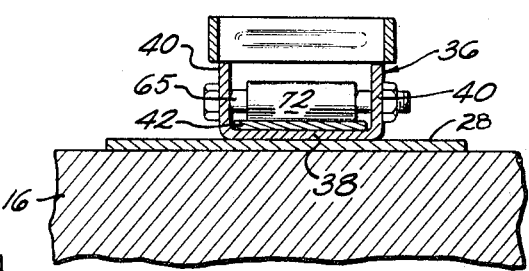

These and other objects of the invention will be apparent from the details of construction and relationship of components of an embodiment thereof, as set forth in the following description and accompanying drawings wherein:

FIG. 1 is an elevational view of a flat bed railway car utilizing cargo hold-down apparatus in accord with the invention, FIG. 2 is a plan view of the railway car of FIG. 1, FIG. 3 is an elevational, sectional view taken along section III—III of FIG. 1, the cargo being illustrated in light lines for purposes of illustration, FIG. 4 is an enlarged, detail, side elevational view of an angle member and web tensioning apparatus in accord with the invention, FIG. 5 is an elevational, front view of an angle member and associated components as taken from the right of FIG. 4, FIG. 6 is an elevational, sectional view taken along VI—VI of FIG. 5, and FIG. 7 is an elevational, sectional view of a railroad car illustrating the apparatus of the invention as employed in another manner with cargo.

In FIGS. 1 through 6 the inventive structure is shown as utilized to hold down a gypsum board cargo on a railway flat car, as this would be typical application of the invention. The railway flat car illustrated includes the conventional flat bed 10 mounted upon the railroad wheels 12. At the ends of the bed 10 transversely disposed bulkheads 14 are provided which vertically extend above the bed to prevent shifting of the cargo in a longitudinal direction. The cargo, which consists of a plurality of gypsum boards or sheets 16 stacked upon each other in a horizontal manner, is mounted upon the bed 10 between the bulkheads 14 to define a total cargo configuration of a rectangular block form. The cargo form includes parallel, lateral, vertically extending sides 18 and an upper surface 20. The lateral sides and upper surface intersect at a right angle to define relatively sharp corners 22.

The cargo hold-down apparatus consists of a plurality of pairs of angular plate members 24 spaced along the length of the cargo. Each angular member of a pair is associated with a different cargo lateral side 18 and with the upper surface to overlie the corners 22. Tension means are employed to connect the angle members with the railway bed and each other, and take-up or tension-producing devices are mounted upon the angular members for tensioning the tension means.

The details of construction of the angle members 24 and the associated components will be best appreciated from FIGS. 4 through 6. The angle members 24 are of identical configuration and, preferably, are formed of sheet metal such as of steel or aluminum. The angle members each include similarly sized, flat, angularly related portions 26 and 28, which are of sufficient width and length to provide an area great enough to adequately distribute the force to the cargo produced during hold-down and shipment to prevent damage to the sheets 16. The portions 26 and 28 intersect at an apex occurring at 30, FIG. 4.

The portion 26 is formed with a concave-convex portion 32, which defines a convex tension member engaging surface 34 which extends the width of the angle member and is parallel and adjacent to the apex 30, FIG. 5.

Tension member take-up or tensioning means are mounted upon the angle member portion 28 in such a manner as to be movable toward and away from the apex 30. In the illustrated embodiment, the tension member take-up is in the form of a buckle 36 which includes winch structure having a reel shaft. The buckle 36 is of a U-shaped configuration, FIG. 6, including a base 38 and legs 40 which extend away from the portion 28. A buckle slide and retainer strap 42 extends over the buckle base 38, and is affixed at its offset ends 44, FIG. 4, to the portion 28 by welding. It will, therefore, be appreciated that the strap 42 maintains the buckle 36 upon the portion 28, yet permits the buckle to be moved toward and away from the apex 30 within the confines of the strap ends 44.

A reel shaft 46, formed of a rectangular tube, extends through circular openings formed in the legs 40, not shown, and is rotatably supported on the legs by these openings. Axial movement of the shaft 46 is prevented by pins 48 extending through the shaft. A ratchet wheel 50 is fixed to the shaft 46 for rotation therewith and a ratchet dog 52 is pivotally mounted upon the left leg 40, FIG. 5, by pivot pin 54. The dog 52 includes an abutment surface 56 adapted to selectively engage the ratchet teeth, and an extension 58 projects beyond the abutment surface 56 for engagement with the actuating cam, as will be later described. A spring 60 mounted at one end in the left leg 40, FIG. 5, bears upon the dog 52 biasing the abutment surface 56 toward engagement with a ratchet tooth. An actuating handle 62 is pivotally mounted upon the shaft 46 and includes a cam surface 64 which is engaged by the dog extension 58. Thus, upon the handle 62 being rotated in a clockwise direction, FIG. 4, the cam 64 will engage the extension 58 and pivot the dog 52 to remove the abutment surface 56 from engagement with a rachet tooth and thereby permit the shaft 46 to rotate.

A tension member anchor bolt 65 extends between the leg portions 40 at a position on the buckle 36 disposed toward the apex 30.

Preferably, the tension members utilized in the practice of the invention are formed to Dacron webbing having a tensile strength of 10,000 pounds. Such webbing is of advantage when used in a hold-down application, as high tension forces can be produced, the webbing is capable of stretching or "give" under shock loads, and has the ability to recover from such stretching without adversely affecting its tension characteristics. Additionally, webbing will not damage the cargo by abrasion and is of a lightweight for easy handling.

One end 66 of a tension member web 68 is wound upon the shaft 46, and the other end of the web is affixed to a suitable anchor at 70 on the railway bed. Preferably, a conventional hook and eye arrangement is employed to removably anchor the lower end of the tension member web 68 to the bed 10.

Another web tension member 72 is permanently connected between the anchor bolts 65 of a pair of angle members 24. The web 72 extends over the upper surface 20 of the cargo, as is apparent in FIGS. 2 and 3.

For purposes of handling, it is desired that a number of pairs of angle members 24 be connected to form a network or system. To this end a webbing strap 74 is connected to the center of the tension members 72 in a slidable connection by passing the web strap 74 through a loop sewed to the tension members 72. Due to the length of the cargo mounted upon the railroad car, it is desirable to separate the network of hold-down apparatus into two parts and, thus, the web strap 74 is disconnectible at its center by a snap ring and delta ring assembly 76. Storage boxes 78 are provided on the bulkheads 14 in which the hold-down apparatus may be stored when not in use.

In operation, the hold-down apparatus will be stored in the boxes 78 while the cargo is being placed upon the railway flat bed 10. After the cargo sheets 16 have been placed as desired upon the flat bed, the hold-down apparatus is removed from the storage boxes and the web strap 74 is positioned longitudinally along the upper surface of the cargo whereby the snap and the delta ring 76 may be interconnected. The various pairs of angle members 24 are then related to the cargo in a manner which will be apparent from FIGS. 1 and 2 wherein the angle members are located on opposite sides of the cargo at the corners 22 such that portions 28 engage edges 18 and portions 26 rest upon cargo surface 20. The tension members 68 are connected to the flat bed 10 by a hook and eye arrangement at anchors 70 wherein the tension member webs 68 will be disposed adjacent the cargo lateral sides 18, while the tension members 72 will lie loosely upon the cargo upper surface 20.

The rectangular shaft 46 is of such dimension that the square drive end of a one-half inch ratchet wrench may be placed within the shaft bore. Actuation of the ratchet wrench is used to rotate the shaft in a counterclockwise direction, FIG. 4, to wind the tension member web 68 upon the shaft and, thus, produce tension in the web. Tensioning of the web 68 will tend to move the buckle 36 to a lower position on the portion 28 as represented by the dotted lines in FIG. 4. Movement of the buckle in a downward direction tensions the web 72 as it is pulled over the surface 34. The operator then tensions the other tension member 68 of the interconnected pair of angle members 24 to produce a tension in the other web 68. Of course, as one buckle 36 is drawn downwardly, the other buckle 36 of the other angle member tends to rise due to the reaction force. Preferably, two operators are employed for simultaneously tensioning the take-ups of an associated pair of angle members. Of course, the web 72 is of such a length that the proper tension is produced in the web 72 when the buckles 36 of an interconnected pair are located at an intermediate position on the portion 28 with respect to the slide defined by the strap 42. If desired, the tension member 72 can include length adjustment means if the cargoes, with which the hold-down apparatus is used, are not of uniform transverse widths.

It is possible to readily produce a tension in the webs 68 and 72 of approximately two thousand pounds, which is sufficient to firmly hold the cargo upon the bed 10 and prevent lateral shifting thereof. As the area of the portions 26 and 28 is sufficient to prevent the angle members from damaging the cargo and as there is no direct engagement between the cargo and the tension members, the cargo is not damaged in any respect. It will be noted from FIG. 4 that as the cargo corners 22 are completely protected by the angle member material at the apex 30 and the portion 32, the angle member protects the cargo at all locations.

As the included angle defined by one of the tension members 68 and the tension member 72 is that angle which includes the cargo, a force will be applied to the portions 26 and 28, due to engagement of the web 72 with the portion 32, which will maintain the angle portions in intimate engagement with the lateral and upper surfaces of the cargo at all times. The movable mounting of the buckle 36 prevents the angle portions 26 and 28 from tilting or shifting relative to the cargo during tightening, and permits an equal distribution of tension forces within the webs during tensioning.

Due to the convex configuration of the surface 34, the web 72 is able to bear upon the angle member 24 adjacent the apex 30 without damage to web 72 and as the web is pulled across the surface 34 during tensioning of the webs 68, no significant abrasion of the web will occur. The forces applied to the surface 34 by the web 72 will lie in a direction within the included angle defined by portions 26 and 28 and, thus, a firm engagement of the angle member with the cargo will occur, even during tensioning of the webs.

When it is desired to remove the hold-down apparatus, the operator pivots the buckle handle 62 in a clockwise direction, FIG. 4, which causes the cam 64 to engage the dog extension 58 and move the abutment surface 56 away from the shaft 46 and disengage the abutment from the associated ratchet tooth. The shaft 46 may then be rotated in a clockwise direction by pulling on webs 68 to release the tension on the webs 68 and 72, and the webs may be unhooked at the bed 10. Disconnecting of the snap and delta ring 76 permits each half of the network to be placed in its storage box. It will be noted that one end of each portion of the web strap 74 remains connected to its storage box to prevent the hold-down apparatus from being stolen, misplaced, or lost from the associated railway car.

In the practice of the invention, it has been found that a cargo tied down with the apparatus disclosed can be more quickly accomplished than wherein chains or straps are employed, and that the webs have a much greater ability to absorb shock and maintain an effective hold-down force than the more nonelastic tension members, such as chains.

FIG. 7 illustrates another manner in which the hold-down of the apparatus of the invention may be employed. In FIG. 7 a railway box car is illustrated having a floor 80 upon which a cargo 82 rests. The angle member 24 is associated with the cargo corner 84 and the web tension member 68' mounted upon the reel shaft is affixed to the floor of the car at 86. Tension member web 88, attached to the anchor bolt of the buckle, is attached at 90 to the wall 92 of the car. It will be apparent that tightening of the tension member 68' will produce tension in the members 68' and 88 providing an effective hold-down force upon the cargo.

I claim:

1. Cargo hold-down apparatus for cargo including first and second angularly related intersecting surfaces comprising, in combination, an angle member consisting of first and second angularly related planar portions interconnected by an apex, a tension member take-up support movably mounted on said first portion for movement toward and away from said apex, a tension member take-up mounted on said support, a tension member engaging surface defined on said angle member adjacent said apex, a tension member anchor defined on said take-up support, a first tension member having an end connected to said take-up and another end fixed relative to the cargo and a second tension member having an end affixed to said anchor and another end fixed relative to the cargo, whereby upon placing of said angle member on the cargo such that said first portion engages the cargo first surface and said second portion engages the cargo second surface and said second tension member passes over said engaging surface such that said tension members define an included angle disposed toward the cargo, actuation of said take-up tensions said tension members imposing a cargo hold-down force on said angle member.

2. Cargo hold-down apparatus as in claim 1 wherein said tension member engaging surface consists of an elongated convex surface defined on said second planar portion extending in the direction of said apex.

3. Cargo hold-down apparatus as in claim 2 wherein said angle member portions are defined by an integrally shaped element, said second angularly related portion including a formed concave-convex, elongated portion disposed adjacent to and parallel to said apex arising from the plane of said second portion away from the included angle defined by said angularly related portions, said convex tension member engaging surface comprising the convex surface of said elongated portion.

4. Cargo hold-down apparatus as in claim 2 wherein said take-up comprises a rotatable reel shaft upon which said first tension member is wound during tensioning.

5. Cargo hold-down apparatus for cargo mounted upon a supporting surface and including lateral surfaces transversely related to the supporting surface and an upper surface intersecting said lateral surfaces comprising, in combination, a pair of angle members, each of said angle members including an angularly related first portion and a second portion intersecting at an apex, said angle members first portions adapted to engage a cargo lateral surface and said second portions adapted to engage the cargo upper surface, the angle members of a pair engaging different lateral surfaces in opposed relation to each other, a tension member take-up support mounted on each angle member first portion, said take-up support being movably mounted on the associated first portion for movement toward and away from the associated apex, a tension member engaging surface defined on said angle member adjacent the apex thereof, a tension member take-up mounted on said support, a tension member anchor defined on each take-up support, first tension member adapted to be tensioned by said take-ups and extending from said take-ups adjacent each cargo lateral side and fixed relative to the cargo supporting surface, a second tension member affixed at each end to an anchor of said take-ups and engaging and extending over said tension member engaging surface and disposed over the cargo upper surface interconnecting the take-ups of said pair whereby movement of said take-ups away from the associated apex due to tensioning of a first tension member will simultaneously tension said second tension member.

6. Cargo hold-down apparatus as in claim 5 wherein a plurality of pairs of angle members and associated tension members are used to hold down the cargo, said pairs of angle members being spaced along the lateral sides of the cargo, and a retainer strap disposed along the cargo upper surface interconnecting the second tension members of said pairs.

7. Cargo control apparatus adapted to interconnect and tension first and second webbing members comprising an angle member having first and second angularly related cargo engageable portions, and an adjustable web tensioning device carried by one of the cargo engageable portions of said angle member and being freely slideable thereon between fixed limits in directions toward and away from the intersection of said cargo engageable portions, said tensioning device including anchor means adapted to be fixed to one end of one of said webbing members and take-up tensioning means adapted to be connected to the other of said webbing members wherein actuation of said take-up tensioning means is adapted to tension both said webbing members and said device is free to move within said limits to accommodate the forces applied thereto by said webbing members.

8. The subject matter of claim 7 wherein said web tensioning device is a ratchet buckle.

References Cited

UNITED STATES PATENTS

| 2,628,397 | 2/1953 | Olson | 24—68 |
| 2,825,522 | 3/1958 | Bolmes et al. | 248—361 |
| 3,141,210 | 7/1964 | Bryant | 248—361 X |
| 3,187,686 | 6/1965 | De Podesta | 105—369 X |
| 3,312,182 | 4/1967 | Broling | 105—369 |

DRAYTON E. HOFFMAN, *Primary Examiner.*